(12) United States Patent
Yudi et al.

(10) Patent No.: US 12,394,774 B2
(45) Date of Patent: Aug. 19, 2025

(54) COMPOSITIONS AND METHODS FOR DRY ELECTRODE FILMS HAVING REDUCED BINDER CONTENT

(71) Applicant: Tesla, Inc., Austin, TX (US)

(72) Inventors: Yudi Yudi, Alameda, CA (US); Hieu Minh Duong, Rosemead, CA (US); Joon Ho Shin, San Diego, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/454,625

(22) Filed: Aug. 23, 2023

(65) Prior Publication Data

US 2023/0411584 A1 Dec. 21, 2023

Related U.S. Application Data

(63) Continuation of application No. 17/043,598, filed as application No. PCT/US2019/032045 on May 13, 2019, now Pat. No. 11,777,070.

(Continued)

(51) Int. Cl.
*H01M 4/04* (2006.01)
*H01G 11/28* (2013.01)
(Continued)

(52) U.S. Cl.
CPC .......... *H01M 4/0402* (2013.01); *H01G 11/28* (2013.01); *H01G 11/42* (2013.01);
(Continued)

(58) Field of Classification Search
CPC ............. H01M 4/0402; H01M 4/1391; H01M 4/623; H01M 2004/021; H01M 4/0435;
(Continued)

(56) References Cited

U.S. PATENT DOCUMENTS

| 11,777,070 B2 | 10/2023 | Yudi et al. |
| 2005/0266298 A1 | 12/2005 | Mitchell |

(Continued)

FOREIGN PATENT DOCUMENTS

| JP | 2015-170550 | 9/2015 |
| JP | 2017-517862 | 10/2015 |

(Continued)

OTHER PUBLICATIONS

International Search Report and Written Opinion dated Oct. 9, 2019 in application No. PCT/US2019/032045.

(Continued)

*Primary Examiner* — Daniel S Gatewood
(74) *Attorney, Agent, or Firm* — Knobbe Martens Olson & Bear LLP

(57) ABSTRACT

Materials and methods for preparing dry cathode electrode film including reduced binder content are described. The cathode electrode film may be a self-supporting film including a single binder. The binder loading may be 3 weight % or less. In a first aspect, a method for preparing a dry free standing electrode film for an energy storage device is provided, comprising nondestructively mixing a cathode active material, a porous carbon, and optionally a conductive carbon to form an active material mixture, adding a single fibrillizable binder to the active material mixture, nondestructively mixing to form an electrode film mixture, and calendering the electrode film mixture to form a free standing electrode film.

26 Claims, 12 Drawing Sheets

Related U.S. Application Data

(60) Provisional application No. 62/671,012, filed on May 14, 2018.

(51) Int. Cl.
*H01G 11/42* (2013.01)
*H01G 11/46* (2013.01)
*H01G 11/50* (2013.01)
*H01M 4/02* (2006.01)
*H01M 4/1391* (2010.01)
*H01M 4/62* (2006.01)

(52) U.S. Cl.
CPC .............. *H01G 11/46* (2013.01); *H01G 11/50* (2013.01); *H01M 4/1391* (2013.01); *H01M 4/623* (2013.01); *H01M 2004/021* (2013.01)

(58) Field of Classification Search
CPC .... H01M 4/625; H01M 10/052; H01G 11/28; H01G 11/42; H01G 11/46; H01G 11/50; H01G 11/06; H01G 11/32; H01G 11/38; H01G 11/86; Y02E 60/10
See application file for complete search history.

(56) References Cited

U.S. PATENT DOCUMENTS

| | | |
|---|---|---|
| 2006/0146479 A1 | 7/2006 | Mitchell |
| 2009/0117461 A1 | 5/2009 | Shembel et al. |
| 2011/0114896 A1* | 5/2011 | Mitchell ............. H01M 4/0416 252/502 |
| 2014/0098464 A1 | 4/2014 | Bendale |
| 2014/0099571 A1* | 4/2014 | Proietti ............... H01M 4/9041 502/185 |
| 2014/0302401 A1 | 10/2014 | Burkhardt et al. |
| 2015/0061176 A1* | 3/2015 | Bruckner ............. H01M 4/0411 264/105 |
| 2015/0072234 A1 | 3/2015 | Mitchell |
| 2015/0255779 A1 | 9/2015 | Hong et al. |
| 2015/0287546 A1 | 10/2015 | Xi et al. |
| 2015/0303481 A1* | 10/2015 | Duong .................. H01M 4/625 241/5 |
| 2015/0325840 A1* | 11/2015 | Mizuike ................ H01M 4/604 429/213 |

FOREIGN PATENT DOCUMENTS

| | | |
|---|---|---|
| JP | 2016-072152 | 5/2016 |
| WO | WO 13/069064 | 5/2013 |
| WO | WO 13/121563 | 8/2013 |

OTHER PUBLICATIONS

Wood et al., Aug. 29, 2017, Technical and economic analysis of solvent-based lithium-ion electrode drying with water and NMP, Drying Technology, 36(2):1-11.

* cited by examiner

COMPOSITIONS AND METHODS FOR DRY ELECTRODE FILMS HAVING REDUCED BINDER CONTENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57, and Rules 4.18 and 20.6. This application claims the benefit as a continuation of U.S. Non-Provisional patent application Ser. No. 17/043,598, filed Sep. 29, 2020, which claims the benefit of priority to PCT Application Number PCT/US2019/032045, filed May 13, 2019, which claims the benefit of priority to U.S. provisional Patent Application No. 62/671,012, filed May 14, 2018 and titled "COMPOSITIONS AND METHODS FOR DRY CATHODE FILMS HAVING REDUCED BINDER CONTENT", which are incorporated by reference herein in their entirety for all purposes.

BACKGROUND

Field of the Invention

The present invention relates generally to energy storage devices, and specifically to materials and methods for cathode electrode films having reduced binder content.

Description of the Related Art

Electrical energy storage cells are widely used to provide power to electronic, electromechanical, electrochemical, and other useful devices. Such cells include batteries such as primary chemical cells and secondary (rechargeable) cells, fuel cells, and various species of capacitors, including ultracapacitors. Increasing the energy storage capacity of energy storage devices, including capacitors and batteries, would be desirable for enhancing utility of energy storage in real-world use cases.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In some embodiments, a dry cathode electrode film is provided. The dry cathode film may advantageously be a free standing electrode film comprising a battery cathode active material, and having less than about 3% binder loading of a single fibrillizable binder.

In a first aspect, a method of fabricating a dry electrode film of an energy storage device is disclosed. The method includes mixing an active material with a porous carbon material to form a dry active material mixture, mixing the dry active material mixture with a dry binder to form a dry electrode film mixture, and calendering the dry electrode film mixture to form a free-standing dry electrode film with a binder loading of at most about 2 wt. %.

In a second aspect, a dry electrode film of an energy storage device is disclosed. The dry electrode film includes 90 wt. % to about 99 wt. % of a dry active material, and at most about 2 wt. % of a dry binder, wherein the dry electrode film is free-standing.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 3A—NMC811, FIG. 3B—NMC111, FIG. 3C—NMC532, FIG. 3D—NCA, FIG. 3E—NMC622, and FIG. 3F—sulfur-carbon composite material.

DETAILED DESCRIPTION

Figure 1:
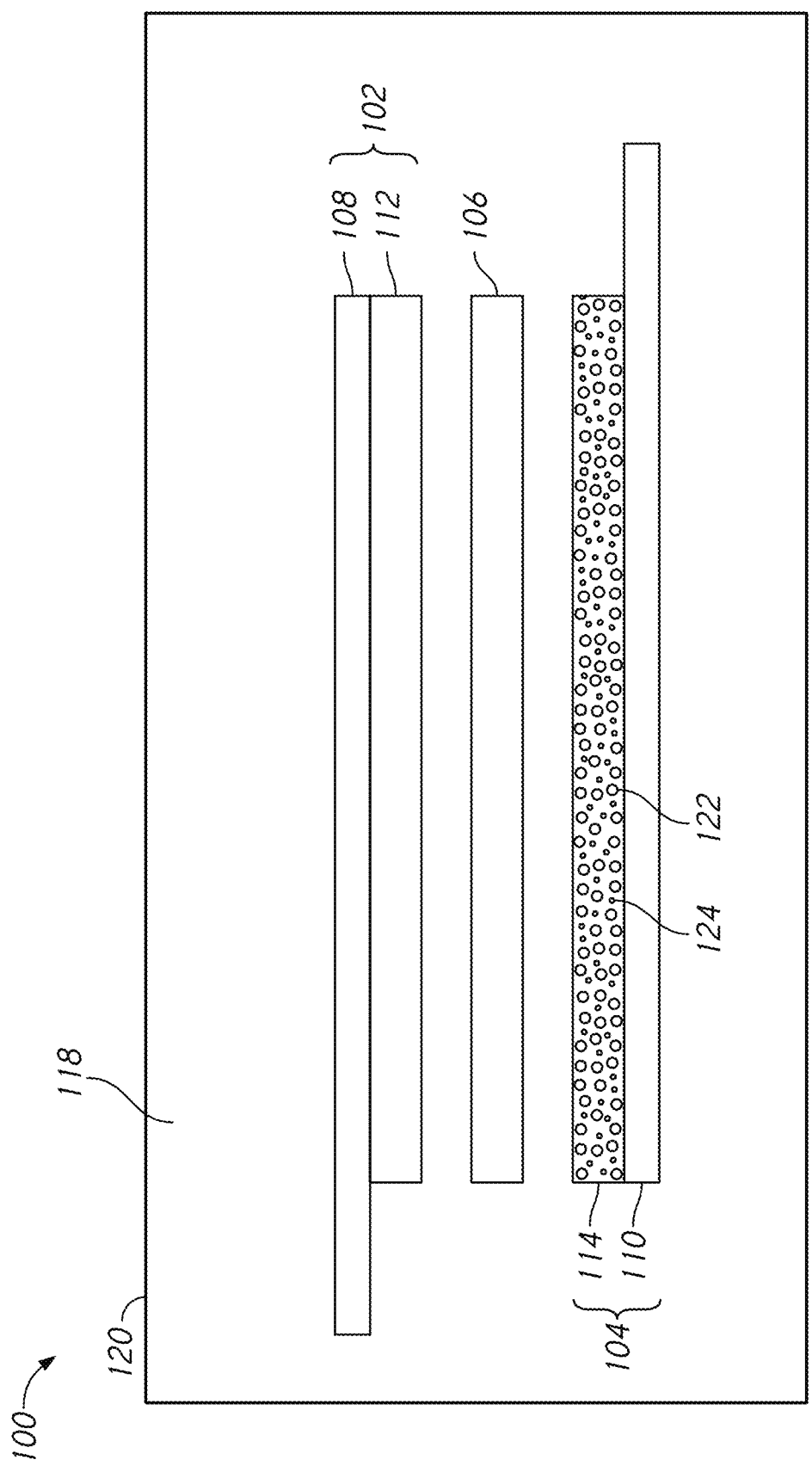
FIG. 1 depicts an embodiment of an energy storage device comprising a reduced binder content.

Various embodiments of materials and methods for reduced binder content and/or reduced damage active materials electrode film mixtures, electrode films, and energy storage devices incorporating the electrode films are described.

Damaged electrode active materials are thought to contribute to a number of processes that result in deterioration of energy storage device performance. Steps employed in typical dry electrode fabrication techniques generally include high shear, high pressure, and/or high velocity processing steps performed on all the dry electrode binder and active materials. Such high shear processing may damage the electrode active materials, and thus contribute to deterioration of device performance once the raw material is formed into an electrode within an energy storage device. Over the life of an energy storage device, deterioration of device performance may manifest as reduced storage capacity, capacitance fade, increased equivalent series resistance (ESR) of the device, self-discharge, pseudocapacity, and/or gas formation. Active materials having reduced damage may improve one or more of these characteristics of an operating device.

One embodiment is a method of making an electrode comprising at least two steps. First, an active material mixture is prepared. The active material mixture generally includes a porous carbon, an active material and, optionally, an additive such as a conductive additive. The components of the active material mixture are first combined and mixed through a relatively low shear, nondestructive process. Second, an electrode film mixture is prepared. In this process, a binder suitable for providing structure to a dry processed electrode film is combined with the active material mixture to form an electrode film mixture. The binder may be a fibrillizable binder, and may comprise, consist essentially, or consist of, polytetrafluoroethylene (PTFE). In one embodiment, only a single, fibrillizable binder is included. Then, the binder is mixed with the active material mixture through a relatively low shear, nondestructive process to form an electrode film mixture. Optionally, an electrode film can then be formed from the electrode film mixture, for example, by pressing or calendering. The use of such a process was found to improve the operating characteristics of the final electrode film.

The electrode film forming processes may be compatible with dry electrode fabrication technology. In some embodiments, no solvents are used in any stage of the electrode film fabrication.

The processability of a self-supporting dry electrode film was found to be dependent on the particle sizes of the constituent materials. Larger particle sizes were found to allow a reduction in binder content, yet still be capable of forming a free-standing dry electrode film. Specifically, in some embodiments, cathode active materials may comprise average ($D_{50}$) particle sizes of at least about or more than about 10 µm, for example, about 10-20 µm. In a further embodiment, the average cathode active material particle size may be on the order of 1/10 the electrode film thickness.

In one embodiment, the electrode films formed using materials and processes as described herein were found to tolerate lower binder loading than those formed using conventional dry electrode film forming processes. Thus, in some embodiments, a binder matrix sufficient to provide a self-supporting electrode film can be provided with reduced binder loading compared to a typical dry electrode process. In some embodiments, only a single binder is required to form a self-supporting dry electrode film.

In some embodiments, the active material may only require 3 passes through a calender to form a self-supporting dry film having a target thickness.

Active materials as incorporated in energy storage device electrode films may have an intraparticle structure that is important for performance in energy storage. For example, particles of cathode active materials, for example lithium metal oxides such as NMC, may have an internal structure. Such materials may be present as secondary particle aggregations of primary particles. The secondary particle aggregates may be decomposed during fabrication of the electrode film. Decomposition is worsened in destructive, e.g., high shear, high pressure and/or high velocity, processing, as has typically been used in dry electrode film fabrication. In some embodiments, only nondestructive processing steps are used in electrode film fabrication.

Embodiments allow nondestructively processed, for example, undamaged and/or pristine, active material particulates to be incorporated into an electrode film mixture to yield an improved performance. Thus, electrode films incorporating reduced degradation bulk active material(s) are provided. For example, cathode active materials may exhibit improved performance relative to applications where the active material is damaged during processing.

As noted above, processing a mixture of binder and active material(s) may break the particles of active material(s). Reduced energy storage performance may result from damage to cathode active materials, for example, due to fissure formation and/or cracking in the active material, or separation of active material(s) from binder and/or from a current collector. The overall performance of the device may be reduced compared to a device incorporating pristine active material(s). Thus, disclosed herein in some embodiments are materials and methods providing active material(s) incurring reduced damage during fabrication.

Further disclosed herein in some embodiments are nondestructive methods for dry cathode electrode fabrication. The nondestructive method may be characterized by low shear, low pressure and/or low velocity processes. Certain embodiments of energy storage devices may provide reduced damage cathode active materials following processing. For example, self-supporting electrode films including reduced damage cathode active material(s) are provided. In some embodiments, the cathode electrode film is a hybrid film including a capacitor active material such as activated carbon, and a battery active material such as an electrochemically active material. Examples of electrochemically active materials include lithium metal oxides, lithium metal phosphates, and lithium sulfides, and cathode active materials described herein.

In some embodiments, the materials and methods may also permit free standing cathode electrode film fabrication using only low shear, nondestructive processing steps. Some binders, such as polytetrafluoroethylene (PTFE), can undergo fibrillization and enable the manufacturing of self-standing films without the aid of a solvent. Manufacturing such films may require physical processing of the bulk binder to create fine particles, which can undergo fibrillization to create a matrix suitable for providing structure to the electrode film. Typically, this binder processing has been performed by a milling or blending operation at high pressure and under high shear forces, and in the presence of the electrode active material(s). The forces applied in processing the binder may alter the form of the active material(s) and damage the surface of the active material(s). For example, the particles of active material(s) may break, fuse, strip, or be chemically altered during such processing.

An electrode film formed using materials and processes as described herein may exhibit improved performance relative to one formed using typical dry electrode film forming processes. For example, the first cycle efficiency of a lithium ion battery including at least one electrode prepared using materials and processes may be improved. For example, first cycle columbic efficiency during electrochemical cycling may be improved. In some embodiments, an electrode film includes reduced binder loading compared to one fabricated using a typical dry electrode process, while mechanical strength of the electrode film is maintained.

Definitions

The terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone or as a component of a multi-cell system.

The voltage of an energy storage device is the operating voltage for a single battery or capacitor cell. Voltage may exceed the rated voltage or be below the rated voltage under load, or according to manufacturing tolerances.

A "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements. A dry electrode film, such as a cathode electrode film or an anode electrode film, may be self-supporting.

A "solvent-free" electrode film is an electrode film that contains no detectable processing solvents, processing solvent residues, or processing solvent impurities. A dry electrode film, such as a cathode electrode film or an anode electrode film, may be solvent-free.

A "wet" electrode, "wet process" electrode, or slurry electrode, is an electrode prepared by at least one step involving a slurry of active material(s), binder(s), and optionally additive(s). A wet electrode may include processing solvents, processing solvent residues, and/or processing solvent impurities.

A "nondestructive" process is a process in which an electrode active material, including the surface of the electrode active material, is not substantially modified during the process. Thus, the analytical characteristics and/or performance in an application, such as incorporation in an energy storage device, of the active material, are identical or nearly identical to those which have not undergone the process. For example, a coating on the active material may be undisturbed or substantially undisturbed during the process. A non-limiting example of a nondestructive process is "nondestructively mixing or blending," or jet milling at a reduced pressure, increased feed rate, decreased velocity (e.g., blender speed), and/or change in other process parameter(s) such that the shear imparted upon an active material remains below a threshold at which the analytical characteristics and/or performance of the active material would be adversely affected, when implemented into an energy storage device. One example of an effective non-destructive mixing process is through the use of a blade type mixer with a tip speed ranging from about 10 meters/min to about 40 meters/min. A "nondestructive" process can be distinguished from a high shear process which substantially modifies an electrode active material, such as the surface of an electrode active material, and substantially affects the analytical characteristics and/or the performance of the active material. For example, high shear blending or high shear jet milling can have detrimental effects on the surface of an electrode active material. A high shear process may be implemented, at the detriment to the active material surface characteristics, to provide other benefits, such as fibrillization of binder material, or otherwise forming a binder/active material matrix to assist in forming a self-supporting electrode film. Embodiments herein may provide similar benefits, while avoiding the detrimental effects of excessive use of high shear processes. In general, the nondestructive processes herein are performed at one or more of a higher feed rate, lower velocity, and/or lower pressure, resulting in a lower shear process than the more destructive processes that will otherwise substantially modify an electrode active material, and thus affect performance.

The term "binder loading" refers to the mass of binder relative to the mass of the final electrode film mixture. Binder loading can be expressed with respect to a single binder, or a "total binder loading" which is the sum of the mass of all types of binders relative to the mass of the final electrode film mixture.

Self-Supporting Electrode Films Having Reduced Binder Content

In some embodiments, compositions and methods for electrode films characterized by reduced binder content are described. Generally, an active material mixture is prepared by combining a cathode active material, a porous carbon, and optionally a conductive additive. The mixing of active material and porous carbon and optionally conductive additive can be by a method provided herein, or by any suitable method. The combining may be by a nondestructive process. The nondestructive mixing may comprise blending, tumbling, or acoustic mixing. The active material mixture may then be mixed with a binder to form an electrode film mixture. The mixing may be by a nondestructive process. The electrode film mixture may then be calendered to form a free-standing electrode film. Fewer passes through a calender may be needed to fabricate a dry self-supporting electrode film as provided herein, as compared to typical dry electrode fabrication methods. In some embodiments, a dry free-standing electrode film suitable for use in an energy storage device is produced after 2, 3, 4, or 5 passes through a calender. In further embodiments, a dry free standing electrode film suitable for use in an energy storage device is produced after 3 passes through a calender.

In one embodiment, the self-supporting dry electrode film may comprise particles having predetermined particle sizes. Larger particle sizes relative to typical dry cathode electrode films were found in some embodiments to allow a reduction in binder content of a free-standing dry electrode film. In some embodiments, the cathode active material particles may on average have a longest dimension of about 8 μm, about 9 μm, about 10 μm, about 12 μm, about 14 μm, about 16 μm, about 18 μm, about 20 μm, about 25 μm, or any range of values therebetween. In further embodiments the cathode active material particles may comprise lithium nickel manganese cobalt oxide (NMC), lithium manganese oxide (LMO), lithium iron phosphate (LFP), lithium cobalt oxide (LCO), lithium titanate (LTO), lithium nickel cobalt aluminum oxide (NCA), or a cathode active material. In a still further embodiment, the cathode active material particles may comprise secondary particles including aggregated primary particles. In some embodiments, a cathode electrode film including substantially pristine or substantially intact secondary particle aggregates of a cathode active material is provided. The cathode active materials may be combined in a hybrid electrode film with capacitive active materials.

An NMC component of the cathode active material may comprise varying compositions of its constituent elements. The NMC may comprise nickel, manganese, and cobalt in varying proportions. Some embodiments provide NMC622, which comprises nickel, manganese, and cobalt in a molar ratio of about 6:2:2, respectively. Some embodiments provide NMC111, which comprises nickel, manganese, and cobalt in a molar ratio of about 1:1:1, respectively. Some embodiments provide NMC532, which comprises nickel, manganese, and cobalt in a molar ratio of about 5:3:2, respectively. Some embodiments provide NMC811, which comprises nickel, manganese, and cobalt in a molar ratio of about 8:1:1, respectively. In some embodiments, the NMC may include about 5-10 wt % lithium, about 15-50 wt % nickel, about 5-20 wt % manganese, and about 5-20 wt % cobalt. Some embodiments provide NMC, including about 5-10 wt % lithium, about 15-50 wt % nickel, about wt % manganese, about 5-20 wt % cobalt, about 25-40 wt % oxygen, and trace impurities, wherein the percentages of lithium, nickel, manganese, cobalt, and oxygen sum to about 100 wt %.

The amounts of binder material and cathode active material can be adjusted. For example, the cathode electrode film can include about 95% cathode active material and 3% binder, or 95% cathode active material and 2% binder. In another example, the cathode electrode film can include at or about 97% cathode active material and at or about 2% or 1.75% binder. In another example, the cathode electrode film can include at or about 98% cathode active material and at or about 1.25% binder. The remaining mass of the electrode may be made up of, for example, porous carbon and/or a conductive additive. The electrode film may have the same amounts of cathode active material(s) and binder as the electrode film mixture from which it is fabricated. In some embodiments, a cathode electrode film can comprise about weight %, about 92 weight %, about 94 weight %, about 95 weight %, about 96 weight %, about 97 weight %, about 98 weight % or about 99 weight % of active material, or any range of values therebetween. In certain embodiments, the cathode active material may be NMC or LFP. In some embodiments, the cathode electrode film can comprise up to about 8 weight % of the porous carbon material, including about 7 weight %, about 5 weight %, about 3 weight %, about 2 weight %, or about 1 weight %, or any range of values therebetween. In certain embodiments, the porous carbon material may be activated carbon. In some embodiments, the cathode electrode film comprises up to about 5 weight %, including about 1 weight %, about 2 weight %, about 3 weight %, about 4 weight %, or about 5 weight %, of the conductive additive. In certain embodiments, the conductive additive may be a conductive carbon, such as a carbon black.

In one embodiment, the cathode electrode film may incorporate lower binder loading than a film formed using typical dry electrode film forming processes. In some embodiments, only a single binder at a low binder loading is needed to form a self-supporting dry electrode film. In a particular embodiment, the single binder is PTFE. In various embodiments, the electrode film mixture, and/or electrode film, can have a binder loading of 1%, 1.5%, 2%, 2.5%, 3% or 5% by mass, or any range of values therebetween. In certain embodiments, the binder loading is about 1.5 to about 3%. In certain embodiments, the cathode electrode film does not include PVDF.

Generally, the binder comprises a fibrillizable binder. The fibrillizable binder may comprise, consist essentially, or consist of PTFE. In some embodiments, an additional binder component may be included in the electrode film. In further embodiments, the binder includes PTFE and a polyolefin, poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the one or more polyolefins can include polyethylene (PE), polypropylene (PP), polyvinylidene fluoride (PVDF), co-polymers thereof, and/or mixtures thereof. The binder can include a cellulose, for example, carboxymethylcellulose (CMC). In some embodiments, the binder particles may have selected sizes. In some embodiments, the binder particles may be about 50 nm, about 100 nm, about 150 nm, about 200 nm, about 250 nm, about 300 nm, about 350 nm, about 400 nm, about 450 nm, about 500 nm, about 1 µm, about 10 µm, about 50 µm, about 100 µm, or any range of values therebetween.

In some embodiments, the electrode film fabrication process comprises combining a cathode active material, activated carbon, and a conductive carbon additive, to form an active material mixture, and then mixing with the active material mixture a binder comprising, consisting essentially, or consisting of PTFE to form an electrode film mixture. The active material mixture and PTFE can be mixed together first by selecting a mixing technique that will effectively mix and disperse the two components without damaging the cathode active material(s). The electrode film mixture is then calendered to form a free standing electrode film. In certain embodiments, an electrode film fabricated by the processes disclosed herein comprises a self-supporting cathode electrode film. In some embodiments, an electrode film fabricated by the processes disclosed herein comprises a self-supporting negative (anode) electrode film. The processes herein may be beneficial towards implementation with a cathode, because cathode active materials are susceptible to particle degradation during processing.

In some embodiments, the electrode film mixture can be formed by a high shear and/or high pressure process. The high shear and/or high pressure process may include jet-milling. The processing time and/or feed rate generally will have an effect on the final particle size of the binder and/or active material(s). For example, a longer time and/or slower feed rate may produce smaller particles.

In some embodiments, the electrode film mixture is subjected to one or more dry electrode process(es), such as that described in U.S. Patent Publication No. 2015/0072234. In some embodiments, a dry electrode is provided, wherein the dry electrode is free from processing contaminants such as solvents, and wherein the dry electrode is prepared by the methods and materials provided herein.

In further embodiments, an electrode fabricated using the materials and methods described herein can be characterized by improved performance. The improved performance may be due to, for example, increased first cycle efficiency. In some embodiments, the first cycle efficiency of an electrode fabricated by the materials and methods provided herein is more than about 85%. In further embodiments, the first cycle efficiency is about 86%, about 87%, about 88%, about 89% about 90%, about 91%, about 92%, about 93%, about 94%, about 95%, or any range of values therebetween, and may be, for example, within a range of about 90 to about 92% or about 90 to about 94%.

An energy storage device described herein may be characterized by reduced rise in equivalent series resistance over the life of the device, which may provide a device with increased power density over the life of the device. In some embodiments, energy storage devices described herein may be characterized by reduced loss of capacity over the life of the device. Further improvements that may be realized in various embodiments include improved cycling performance, including improved storage stability during cycling, power delivery, and reduced capacity fade. In some embodiments, capacity retention is at least 75%, at least 80%, at least 85%, or at least 90% of original capacity after 2000 cycles. In further embodiments, capacity at a C-rate of 2 is at least 75%, at least 80%, at least 85%, or at least 90% of capacity at a C-rate of 0.1. Some embodiments provide dry electrode full cells having capacity at a C-rate of 1 that is at least 10%, at least 20%, or at least 30% higher than a wet electrode full cell having substantially the same active material loading.

The materials and methods provided herein can be implemented in various energy storage devices. An energy storage device can be a capacitor, a lithium ion capacitor (LIC), an ultracapacitor, a battery, or a hybrid energy storage device and/or a hybrid cell, combining aspects of two or more of the foregoing. In preferable embodiments, the device is a battery. The energy storage device can be characterized by an operating voltage. In some embodiments, an energy storage device described herein can have an operating voltage of about 0 V to about 4.5 V. In further embodiments, the operating voltage can be about 2.7 V to about 4.2 V, about 3.0 to about 4.2 V, or any range of values therebetween.

An energy storage device may include one or more electrodes. The electrode film can be formed from a mixture of one or more binders and one or more active electrode material(s). It will be understood that an electrode film can be used in various embodiments with any of a number of energy storage devices and systems, such as one or more batteries, capacitors, capacitor-battery hybrids, fuel cells, or other energy storage systems or devices, and combinations thereof. In some embodiments, an electrode film described herein may be a component of a lithium ion capacitor, a lithium ion battery, an ultracapacitor, or a hybrid energy storage device combining aspects of two or more of the foregoing.

An energy storage device can be of any suitable configuration, for example planar, spirally wound, button shaped, or pouch. An energy storage device can be a component of a system, for example, a power generation system, an uninterruptible power source systems (UPS), a photo voltaic power generation system, an energy recovery system for use in, for example, industrial machinery and/or transportation. An energy storage device may be used to power various electronic device and/or motor vehicles, including hybrid electric vehicles (HEV), plug-in hybrid electric vehicles (PHEV), and/or electric vehicles (EV).

FIG. 1 shows a side cross-sectional schematic view of an example of an energy storage device 100 having an electrode film having a reduced binder content. The energy storage device 100 may be classified as, for example, a capacitor, a battery, a capacitor-battery hybrid, or a fuel cell.

The device can have a first electrode 102, a second electrode 104, and a separator 106 positioned between the first electrode 102 and second electrode 104. Either or both of the electrodes 102 and 104 may be fabricated according to the materials and processes provided herein. The first electrode 102 and the second electrode 104 may be placed adjacent to respective opposing surfaces of the separator 106. The energy storage device 100 may include an electrolyte 118 to facilitate ionic communication between the electrodes 102, 104 of the energy storage device 100. For example, the electrolyte 118 may be in contact with the first electrode 102, the second electrode 104 and the separator 106. The electrolyte 118, the first electrode 102, the second electrode 104, and the separator 106 may be received within an energy storage device housing 120. One or more of the first electrode 102, the second electrode 104, and the separator 106, or constituent thereof, may comprise porous material. The pores within the porous material can provide containment for and/or increased surface area for reactivity with an electrolyte 118 within the housing 120. The energy storage device housing 120 may be sealed around the first electrode 102, the second electrode 104 and the separator 106, and may be physically sealed from the surrounding environment.

In some embodiments, the first electrode 102 can be an anode (the "negative electrode") and the second electrode 104 can be the cathode (the "positive electrode"). The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise electrode films 112 and 114, respectively. Electrode films 112 and 114 can have any suitable shape, size and thickness. For example, the electrode films can have a thickness of about 30 microns (μm) to about 250 microns, for example, about 50 microns, about 100 microns, about 150 microns, about 200 microns, about 250 microns, or any range of values therebetween. The electrode films can comprise one or more materials, or be fabricated using processes, provided herein. In some embodiments, at least one of electrode films 112 and 114 can include an electrode film mixture comprising binder material and a cathode active material. As illustrated, the second electrode film 114 comprises cathode active material particles 122 and binder material particles 124, and a reduced binder content. In some embodiments, the active material can be a cathode active material. In some embodiments, the cathode active material can be, for example, a metal oxide, metal sulfide, a sulfur-carbon composite, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), lithium nickel manganese oxide (LNMO) and/or a lithium nickel cobalt aluminum oxide (NCA). In some embodiments, cathode active materials can be comprised of, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)) or an olivine (such as $LiFePO_4$). The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an area-normalized specific capacity (i.e., areal capacity) of at least 10 mAh/cm2. In some embodiments, the cathode film comprising a sulfur or a material including sulfur active material has an electrode film density of 1 g/cm3. In some embodiments, the cathode film comprising a sulfur or a material including sulfur active material further comprises a binder.

The at least one active material may include one or more carbon materials. The carbon materials may be selected from, for example, graphitic material, graphite, graphene-containing materials, hard carbon, soft carbon, carbon nanotubes, porous carbon, conductive carbon, or a combination thereof. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon. In preferred embodiments, the active material comprises, consists essentially of, or consists of graphite.

The first electrode film 112 and/or the second electrode film 114 may also include one or more binders. In some embodiments, the first electrode film 112 and/or the second electrode film 114 may include a single binder. In some embodiments, the binder can include one or more polymers. In some embodiments, the binder can include one or more fibrillizable binder components. The binder component may be fibrillized to provide a plurality of fibrils, the fibrils providing desired mechanical support for one or more other components of the film. In some embodiments, a binder component can include one or more of a variety of suitable fibrillizable polymeric materials.

Generally, the electrode films described herein can be fabricated using a modified dry fabrication process. For example, some steps may be as described in U.S. Patent Publication No. 2005/0266298 and U.S. Patent Publication No. 2006/0146479. These, and any other references to extrinsic documents herein, are hereby incorporated by reference in their entirety. A dry fabrication process can refer to a process in which no or substantially no solvents are used in the formation of an electrode film. For example, components of the electrode film, including carbon materials and binders, may comprise dry particles. The dry particles for forming the electrode film may be combined to provide a dry particles electrode film mixture. In some embodiments, the electrode film may be formed from the dry particle electrode film mixture such that weight percentages of the components of the electrode film and weight percentages of the components of the dry particles electrode film mixture are substantially the same. In some embodiments, the electrode film formed from the dry particle electrode film mixture using the dry fabrication process may be free from, or substantially free from, any processing additives such as solvents and solvent residues resulting therefrom. In some embodiments, the resulting electrode films are self-supporting electrode films formed using the dry process from the dry particle mixture. In some embodiments, the resulting electrode films are free-standing electrode films formed using the dry process from the dry particle mixture. A process for forming an electrode film can include fibrillizing the fibrillizable binder component(s) such that the electrode film comprises fibrillized binder. In further embodiments, a free-standing electrode film may be formed in the absence of a current collector. In still further embodiments, an electrode film may comprise a fibrillized polymer matrix such that the electrode film is self-supporting.

With continued reference to FIG. 1, the first electrode 102 and the second electrode 104 include a first current collector 108 in contact with first electrode film 112, and a second current collector 110 in contact with the second electrode film 114, respectively. The first current collector 108 and the second current collector 110 may facilitate electrical coupling between each corresponding electrode film and an external electrical circuit (not shown). The first current collector 108 and/or the second current collector 110 can comprise one or more electrically conductive materials, and have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise an aluminum foil. The aluminum foil can have a rectangular or substantially rectangular shape sized to provide transfer of electrical charge between the corresponding electrode and an external electrical circuit.

In some embodiments, the energy storage device 100 is a lithium ion battery or hybrid energy storage device including a cathode comprising a cathode active material. In some embodiments, the lithium ion battery is configured to operate at about 2.5 to 4.5 V, or 2.7 to 4.2 V.

Technologies described herein may be used separately or in combination in an energy storage device to enable operation under the selected conditions.

In some embodiments, energy storage device 100 can be a lithium ion energy storage device such as a lithium ion capacitor, a lithium ion battery, or a hybrid lithium ion device. Generally, a lithium ion energy storage device comprises a cathode including a lithium-containing cathode active material, and an anode electrode film suitable for interacting with lithium ions.

In some embodiments, an anode electrode film may comprise an active material, a binder, and optionally a conductive additive. In some embodiments, the conductive additive may comprise a conductive carbon additive, such as carbon black. In some embodiments, the active material of the anode may comprise a graphitic carbon, synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the active material, including about 90 weight % to about 98 weight %, or about 94 weight % to about 97 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode film may not include a conductive additive.

In some embodiments, the electrode film, for example, anode electrode film, of a lithium ion energy storage device electrode comprises a carbon configured to reversibly intercalate lithium ions. In some embodiments, the lithium intercalating carbon is selected from a graphitic carbon, graphite, hard carbon, soft carbon and combinations thereof. For example, the electrode film of the electrode can include a binder material, one or more of graphitic carbon, graphite, graphene-containing carbon, hard carbon and soft carbon, and an electrical conductivity promoting material. In some embodiments, an electrode is mixed with lithium metal and/or lithium ions. The anode electrode film may be a dry self-supporting electrode film.

Some embodiments include an electrode, such as an anode and/or a cathode, having one or more electrode films comprising a polymeric binder material. In some embodiments, the binder may comprise PTFE. In further embodiments, the binder may comprise PTFE and one or more additional binder components. In some embodiments, the binder may comprise one or more polyolefins and/or co-polymers thereof, and PTFE. In some embodiments, the binder may comprise a PTFE and one or more of a cellulose, a polyolefin, a polyether, a precursor of polyether, a polysiloxane, co-polymers thereof, and/or admixtures thereof. In some embodiments, the binder can include branched polyethers, polyvinylethers, co-polymers thereof, and/or the like. The binder can include co-polymers of polysiloxanes and polysiloxane, and/or co-polymers of polyether precursors. For example, the binder can include poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the one or more polyolefins can include polyethylene (PE), polypropylene (PP), polyvinylidene fluoride (PVDF), co-polymers thereof, and/or mixtures thereof. The binder can include a cellulose, for example, carboxymethylcellulose (CMC). An admixture of polymers may comprise interpenetrating networks of the aforementioned polymers or co-polymers.

The binder may include various suitable ratios of the polymeric components. For example, PTFE can be up to about 100 weight % of the binder, for example, from about 20 weight % to about 95 weight %, about 20 weight % to about 90 weight %, including about 20 weight % to about 80 weight %, about 30 weight % to about 70 weight %, or about 30 weight % to about 50 weight %. In further embodiments, the binders can comprise PTFE, CMC, and PVDF as binders. In certain embodiments, the electrode film can comprise 2 weight % PTFE, 1 weight % CMC, and 1 weight % PVDF. For example, the binder mixture can include a mass of PTFE which is 50% of the total binder content of the electrode film, and 2% of the total mass of the electrode film.

In further embodiments, the energy storage device 100 is charged with a suitable lithium-containing electrolyte. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, or any range of values therebetween.

In some embodiments, an energy storage device can include a solvent. The solvent may be in liquid phase under the nominal operating conditions of the device. A solvent need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise $LiPF_6$, and one or more carbonates.

In some embodiments, the active material includes a treated carbon material, where the treated carbon material includes a reduction in a number of hydrogen-containing functional groups, nitrogen-containing functional groups and/or oxygen-containing functional groups, as described in U.S. Patent Publication No. 2014/0098464. For example, the treated carbon particles can include a reduction in a number of one or more functional groups on one or more surfaces of the treated carbon, for example about 10% to about 60% reduction in one or more functional groups compared to an untreated carbon surface, including about 20% to about 50%. The treated carbon can include a reduced number of hydrogen-containing functional groups, nitrogen-containing functional groups, and/or oxygen-containing functional groups. In some embodiments, the treated carbon material comprises functional groups less than about 1% of which contain hydrogen, including less than about 0.5%. In some embodiments, the treated carbon material comprises functional groups less than about 0.5% of which contains nitrogen, including less than about 0.1%. In some embodiments, the treated carbon material comprises functional groups less than about 5% of which contains oxygen, including less than about 3%. In further embodiments, the treated carbon material comprises about 30% fewer hydrogen-containing functional groups than an untreated carbon material.

Figure 2:
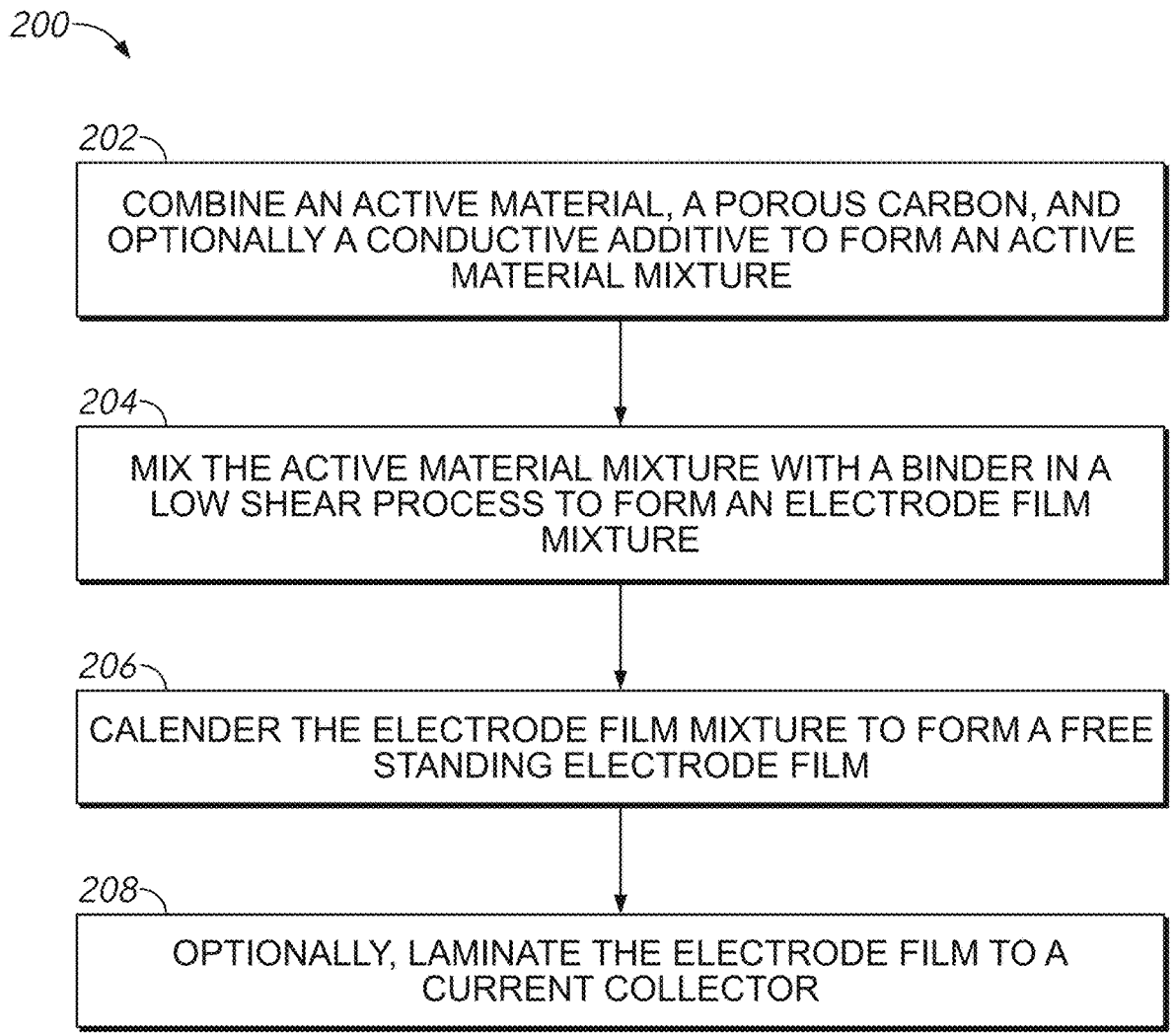
FIG. 2 is a flow chart showing one embodiment of a process for preparing electrode film mixtures.

In some embodiments, a method for fabricating an energy storage device is provided. FIG. 2 depicts an embodiment of a method 200 for preparing an electrode film mixture for use in an energy storage device. In step 202, an active material, a porous carbon, and optionally a conductive additive are combined to form an active material mixture. In step 204, the active material mixture is mixed with a binder in a low shear process to form an electrode film mixture. In step 206, the electrode film mixture is calendered to form a free standing electrode film. Generally, step 206 results in a binder matrix within the electrode film such that the electrode film is self-supporting. In step 208, the free standing electrode film is optionally laminated to a current collector. In some embodiments, each step of method 200 is a dry process step in which no solvents are used.

EXAMPLES

Comparative Example 1

Activated carbon was combined with dry PVDF powder in a mass ratio of 4:2 and the mixture was blended for 10 minutes. The resulting mixed powder was jet-milled. NMC622, additional activated carbon, and carbon black were added, and the resulting mixture was blended to a uniform tap density. The powder was combined with the jet-milled activated carbon/PVDF mixture, and the resulting mixture was blended for 5 minutes. Finally, PTFE was added, and the mixture was blended for 10 minutes. The final electrode film comprised 88:5:2:2:3 NMC622: activated carbon:carbon black:PVDF:PTFE. Thus, active material loading was 88%, and total binder loading was 5%.

Comparative Example 2

Activated carbon was combined with dry PVDF powder in a mass ratio of 4:2 and the mixture was blended for 10 minutes. The resulting mixed powder was jet-milled. NMC811, additional activated carbon, and carbon black were added, and the resulting mixture was blended to a uniform tap density. The powder was combined with the jet-milled activated carbon/PVDF mixture, and the resulting mixture was blended for 5 minutes. Finally, PTFE was added, and the mixture was blended for 10 minutes and pressed on a 2-roll calender mill to form a free-standing film. The final electrode film comprised 92:3.3:1.5:1.7:1.5 NMC811: activated carbon:carbon black:PVDF:PTFE. Thus, active material loading was 92%, and total binder loading was 3.2%. The cathode film was laminated on to a carbon coated aluminum foil to yield a dry coated electrode with loading weight of 16.6 mg/cm2 and thickness of 53 microns. This electrode was evaluated against a lithium metal counter electrode in a CR2032 coin cell. The first charge and discharge specific capacity is measured at about 224 mAh/g and 202 mAh/g, respectively.

Example 1

NMC622 (Umicore), activated carbon (YP-17D, Kuraray), and conductive carbon (carbon black, Ketjenblack ECP600JD, Lion Corp.) were combined, and the mixture was blended for 30 to 45 minutes at 3800 rpm. PTFE was then added, and the resulting mixture was blended for 20 to 25 additional minutes at 3800 rpm at high shear. The final electrode film comprised 94:2:1:3 NMC622: activated carbon: conductive carbon: PTFE. Thus, active material loading was 94%, and total binder loading was 3%.

Example 2

A second electrode film was fabricated according to the method of Example 1, but the final electrode film comprised 95:2:1:2 NMC622: activated carbon: conductive carbon: PTFE. Thus, active material loading was 95%, and total binder loading was 2%.

Data for the two electrode films of Examples 1 and 2 is provided in Table 1. The charge capacity, discharge capacity, and efficiency are for cathode half-cells of Example 1 and Example 2. In Table 1, the Gurley number indicates the time in seconds for 100 cc of air to pass through a one-square inch of membrane when a standard constant pressure of 60 pounds per square inch is applied.

Example 3

Figure 3A:
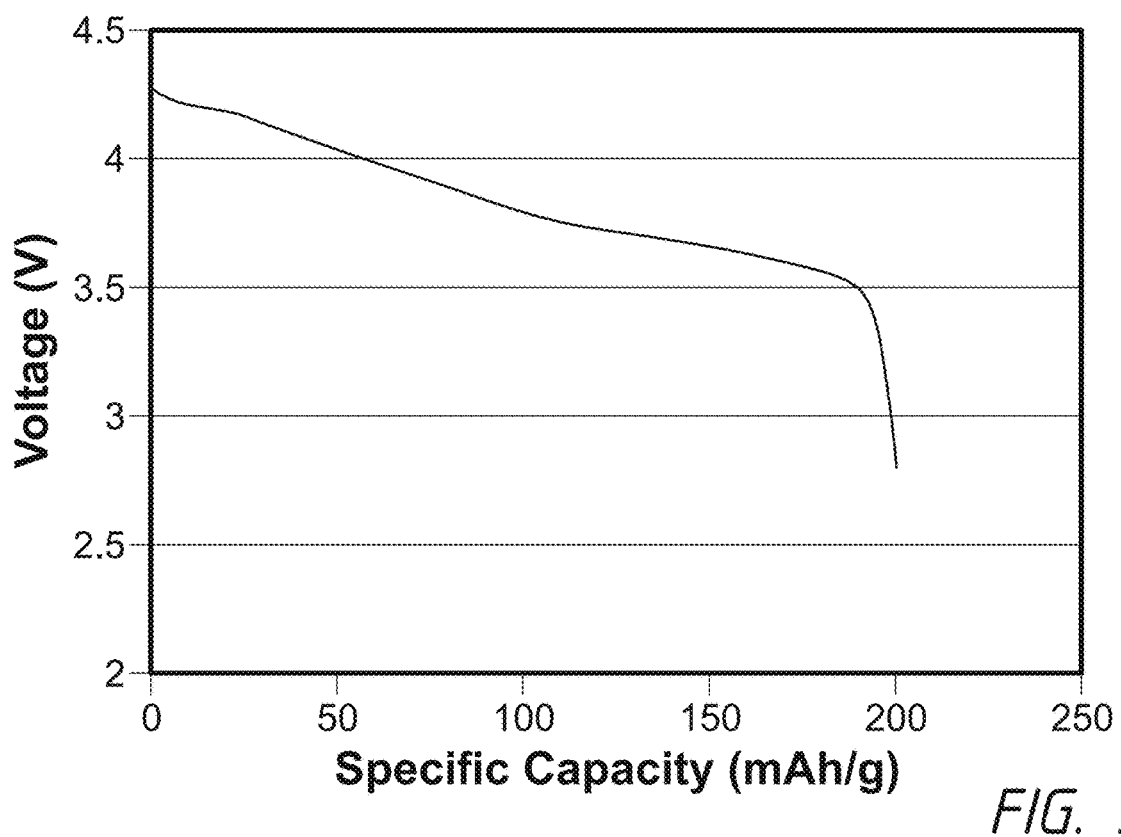
FIGS. 3A-3F are line graphs showing voltage vs. specific capacity data for various cathode active material films including PTFE as sole binder according to Example 3, as follows.
Figure 3B:
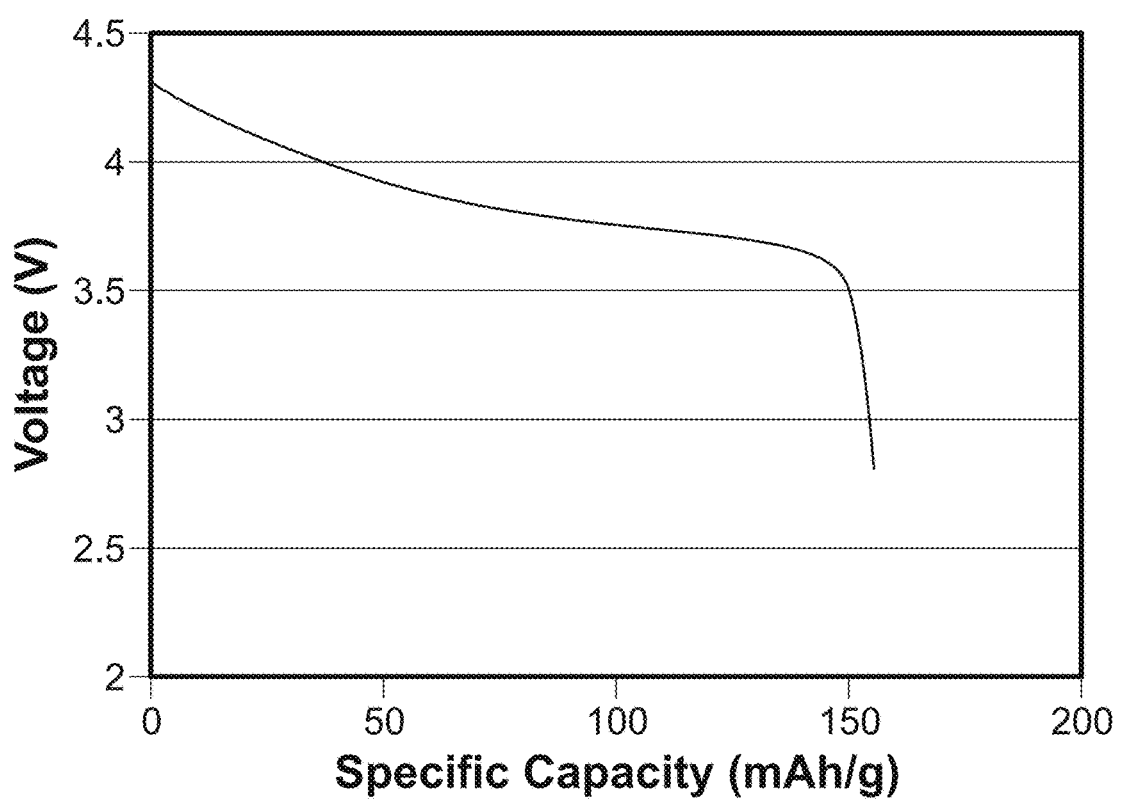
Figure 3C:
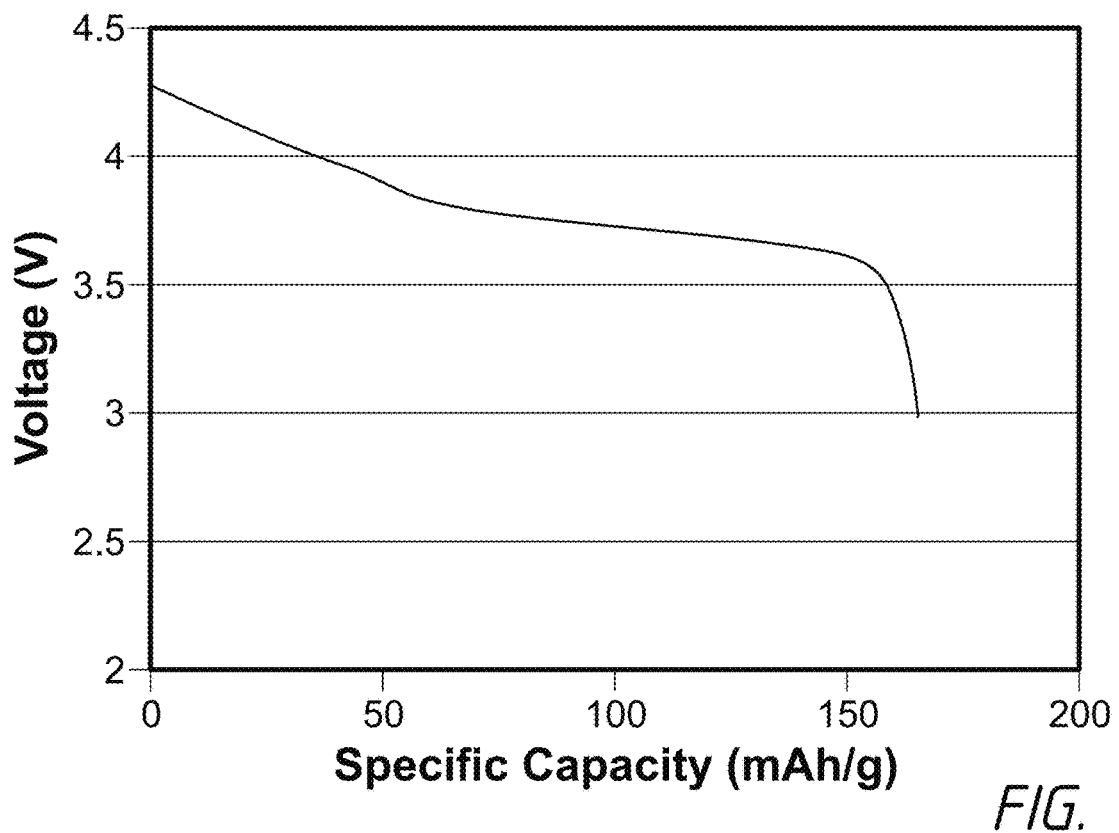
Figure 3D:
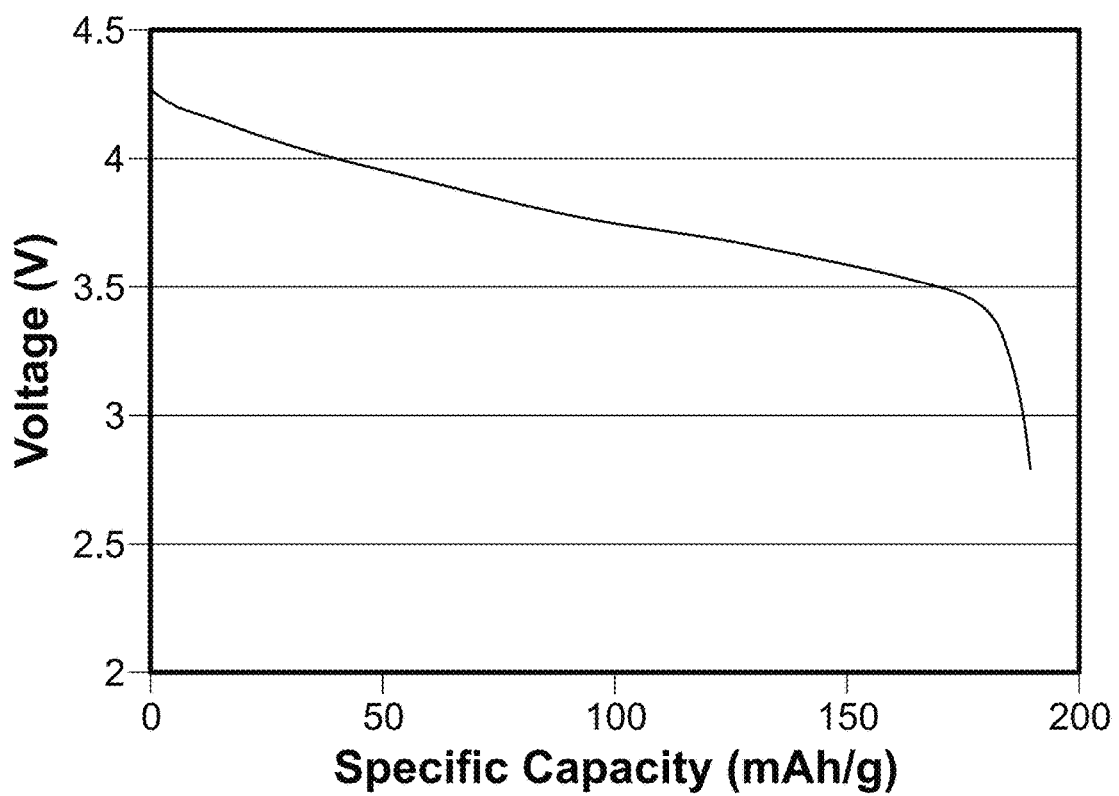
Figure 3E:
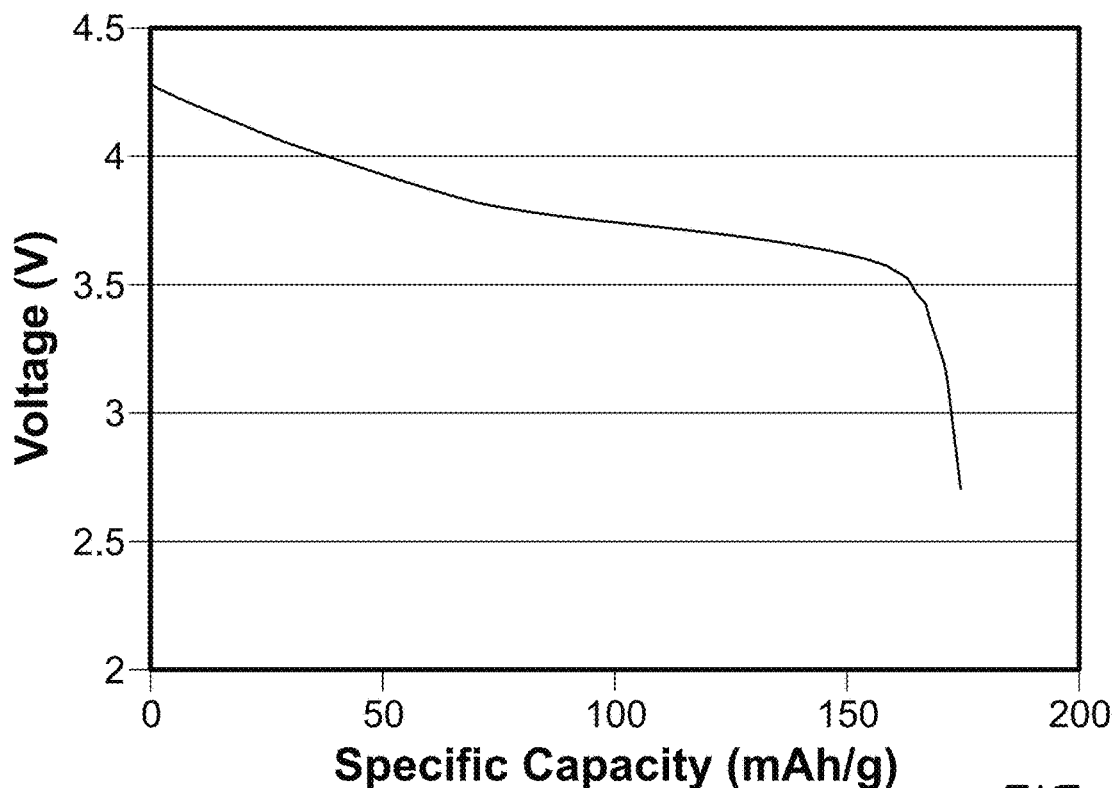
Figure 3F:
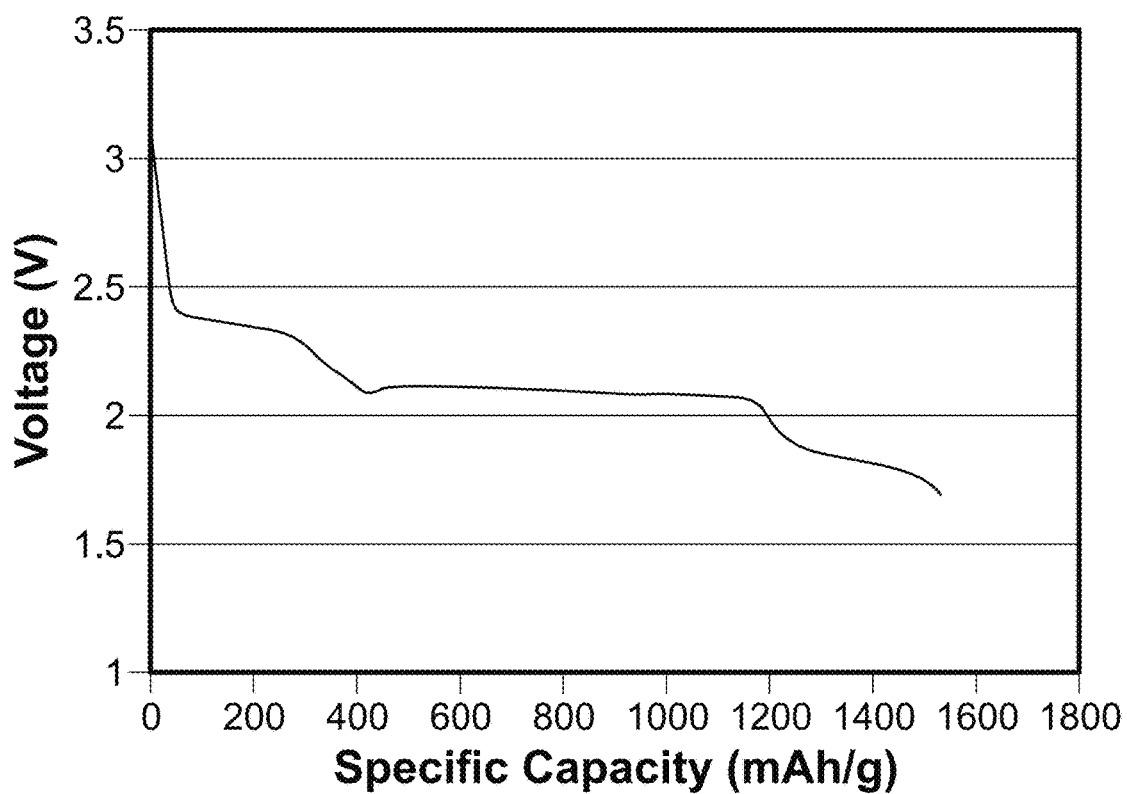

Additional cathode electrode films were fabricated according to the method of Example 1, but including various cathode active materials. PTFE was the sole binder in each electrode film. FIGS. 3A-3F provide voltage vs. specific capacity data for the various cathode electrode films, as follows: FIG. 3A—NMC811, FIG. 3B—NMC111, FIG. 3C—NMC532, FIG. 3D—NCA, FIG. 3E—NMC622, and FIG. 3F—sulfur-carbon composite. As seen in FIGS. 3A-3E, each of the NMC dry coated electrodes exhibited discharge profiles with stable voltage plateaus at the end of the discharge process to yield their corresponding designed specific capacity accounting for active material (NCA specific charge capacity is about 219 mAh/g and specific discharge capacity is about 195-200 mAh/g; NMC622 specific charge capacity is about 200 mAh/g and specific discharge capacity is about 175 mAh/g; NMC811 specific capacity is about 195-210 mAh/g), indicating that almost all the active material particles were accessible in each case.

Example 4

Figure 4:
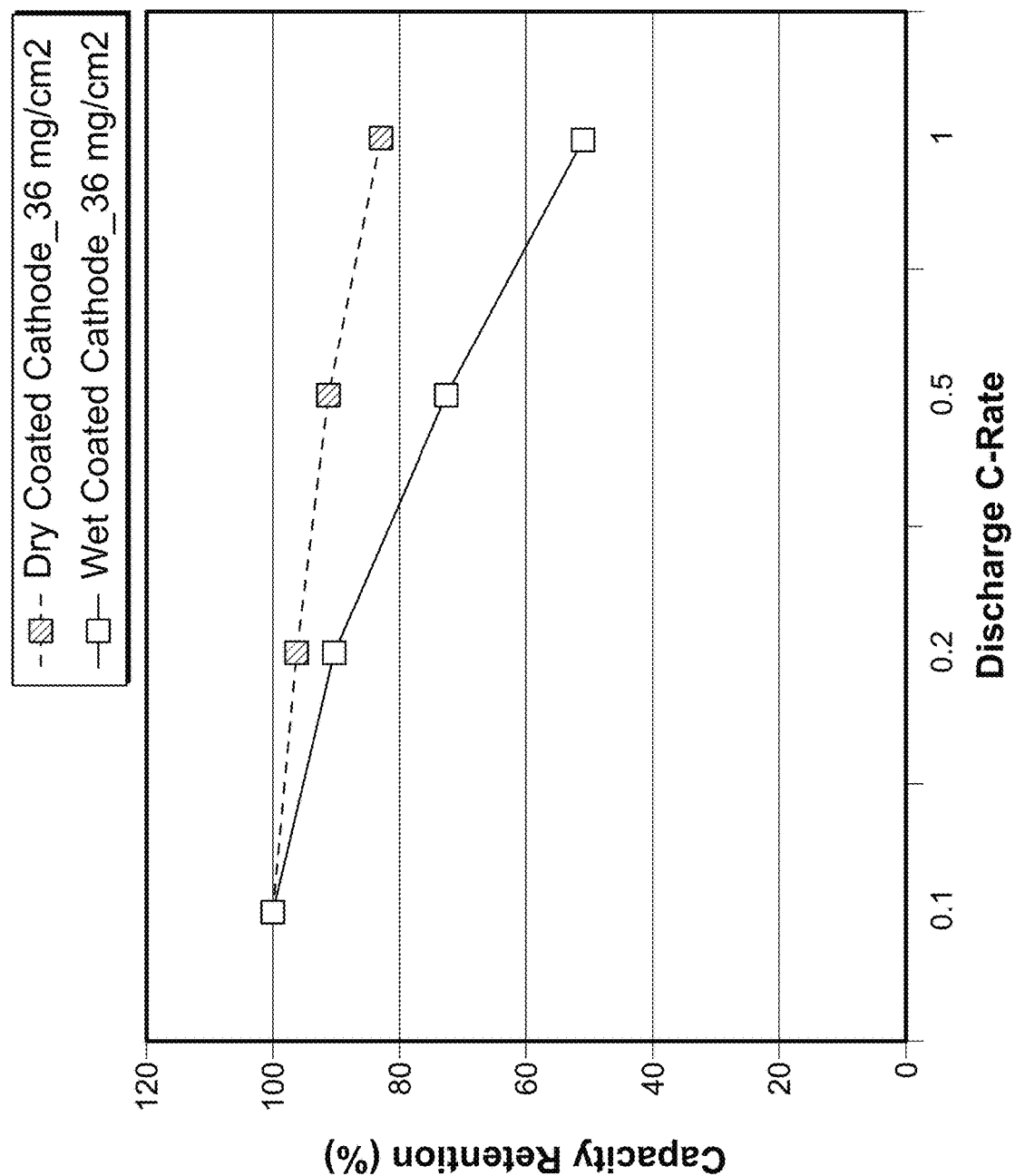
FIG. 4 is a line graph of capacity retention vs. discharge C-rates showing comparative capacity retention data for a first cell having a dry coated cathode and anode, and a second cell having a wet coated cathode and anode, according to Example 4.

Two cells, a first cell electrodes made with a dry process, and a second cell having electrodes made through a wet process, were prepared. The cathodes of both cells included NMC111 as the cathode active material and graphite as the anode active material, at the same concentrations of active materials. A constant current of 0.1 C was applied to charge the cell to 100% SOC prior to discharge. Discharge was conducted at various C-rates. Under low constant current discharge, both coated electrode types yielded cell discharge capacity of 105 mAh, and the results were used as a standard to normalize cell capacity. Electrode loading was 5 mAh/cm$^2$ (cathodes at 36 mg/cm$^2$) for each cell, and cut-off voltage was 4.2V and 2.8V for charge and discharge, respectively. Comparative capacity retention data for the dry coated and wet coated cells is provided in FIG. 4. The dry process electrode film had better capacity at high discharge rates (up to 1 C as measured).

Example 5

Figure 5:
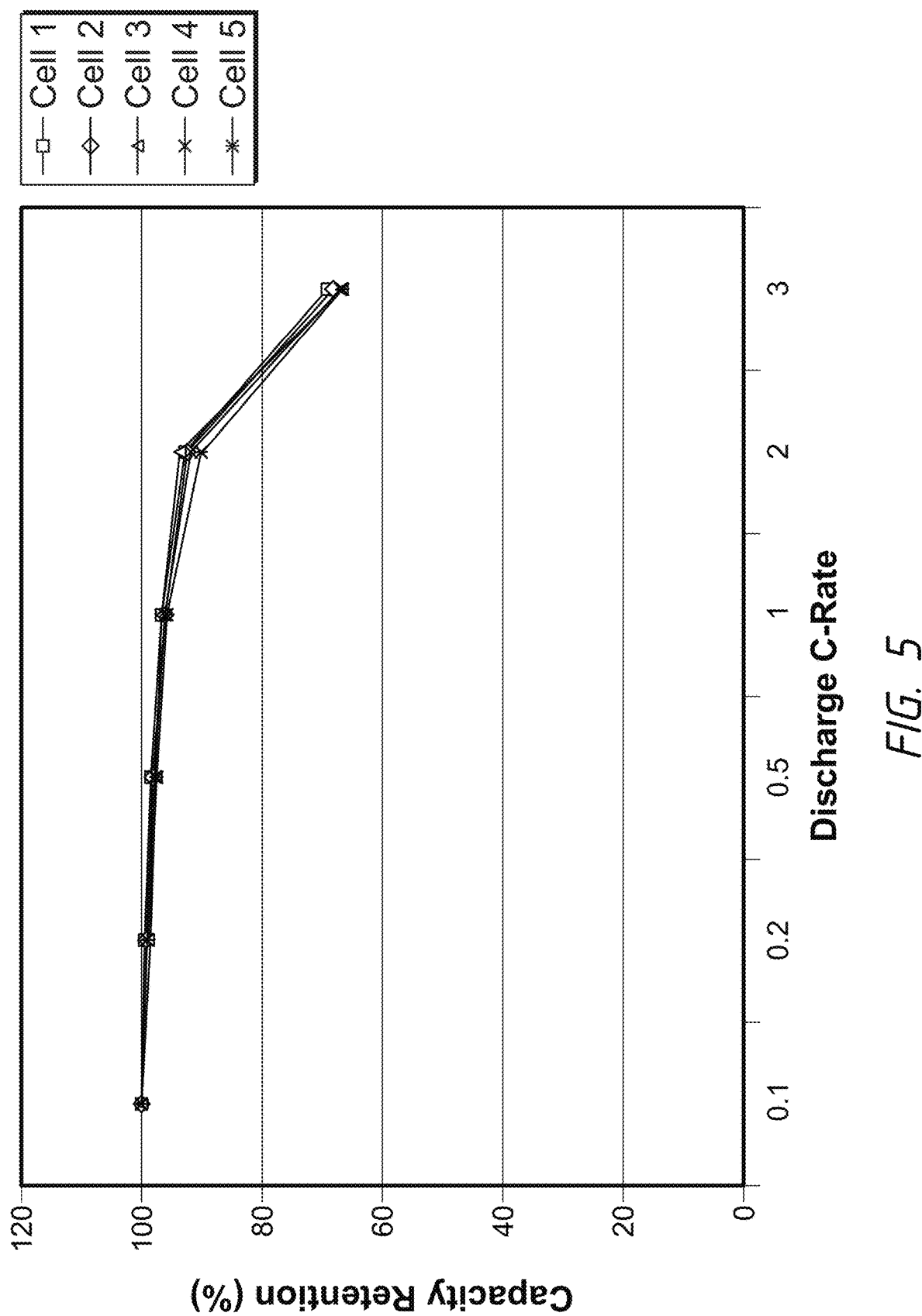
FIG. 5 is a line graph of capacity retention vs. discharge C-rates showing capacity retention data at a 2C discharge rate for five cells having NMC111 as cathode active material, according to Example 5.

Five additional cells were fabricated, each including NMC111 cathode electrode films made with a dry process. Each cell included dry coated NMC111 (94 wt. % loading) cathode and graphite (96 wt. % loading) anode electrodes, in a pouch cell configuration. NMC111 electrode loading was 27 mg/cm$^2$ (areal capacity 4 mAh/cm$^2$). The cell was charged to 4.2V at constant current followed by constant voltage at 4.2V and discharged to 2.8V. FIG. 5 provides rate performance data. Capacity retention for each of the five cells incorporating dry coated electrodes was above 90% at a 2C discharge rate.

A higher rate capability was found in the dry coated electrodes, as seen in FIG. 5. The high energy density and

TABLE 1

| Example | Thickness (μm) | Loading (mg/cm$^2$) | Gurley number (sec) | Charge capacity (mAh/g) | Discharge capacity (mAh/g) | First Cycle Efficiency (%) |
|---|---|---|---|---|---|---|
| 1 | 130-133 | 40 | 22-26 | 197 | 179 | 91 |
| 2 | 131-133 | 40 | 18-21 | 196 | 178 | 90.8 | power capability are attributed to low charge transfer and contact resistance in the dry coated electrodes.

Example 6

Figure 6:
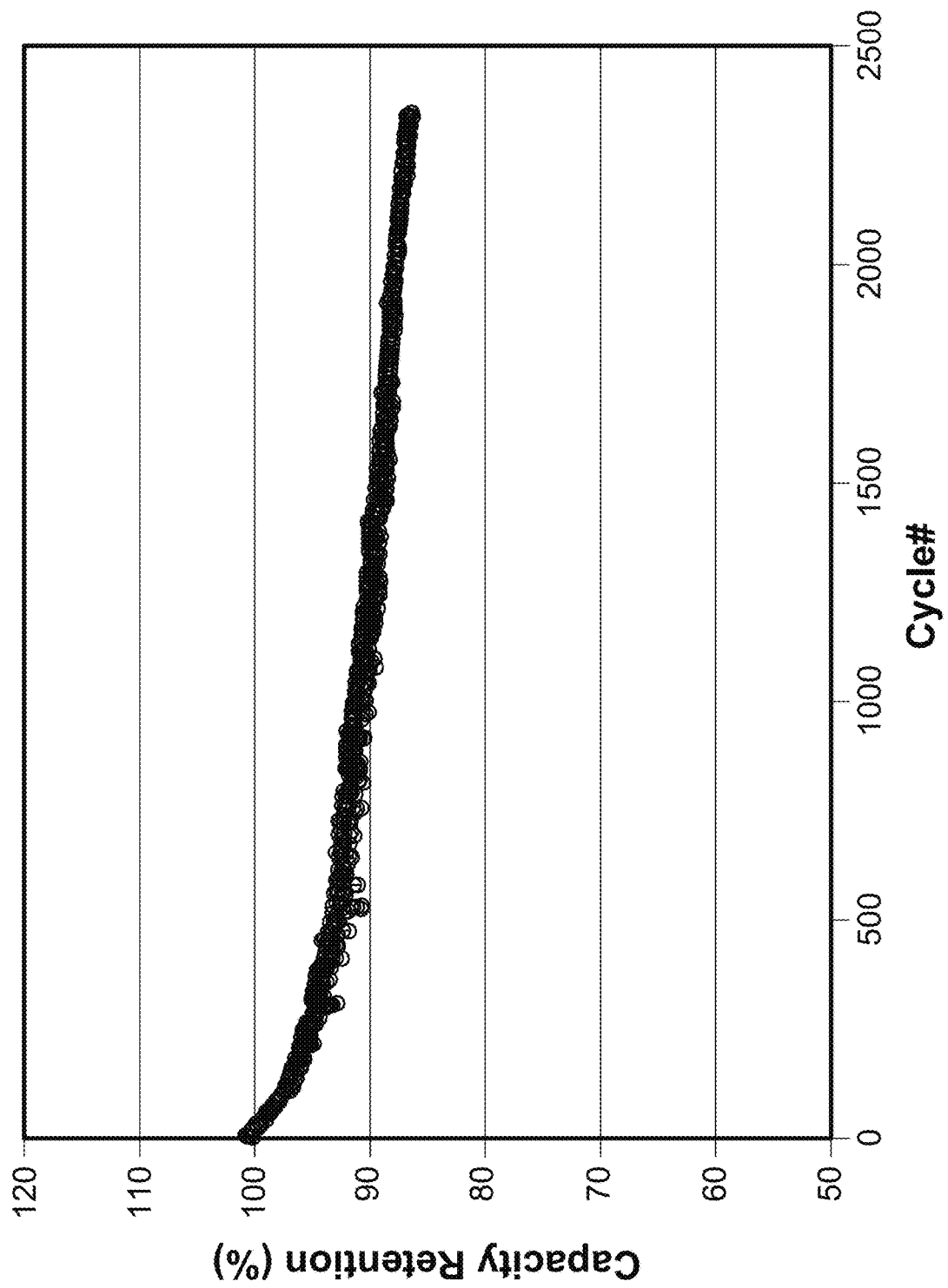
FIG. 6 is a line graph of capacity retention vs. number of cycles showing cycling performance data for cells having dry electrodes cycled at 100% depth of discharge (DOD) using constant current charge and discharge rates, according to Example 6.
Figure 7A:
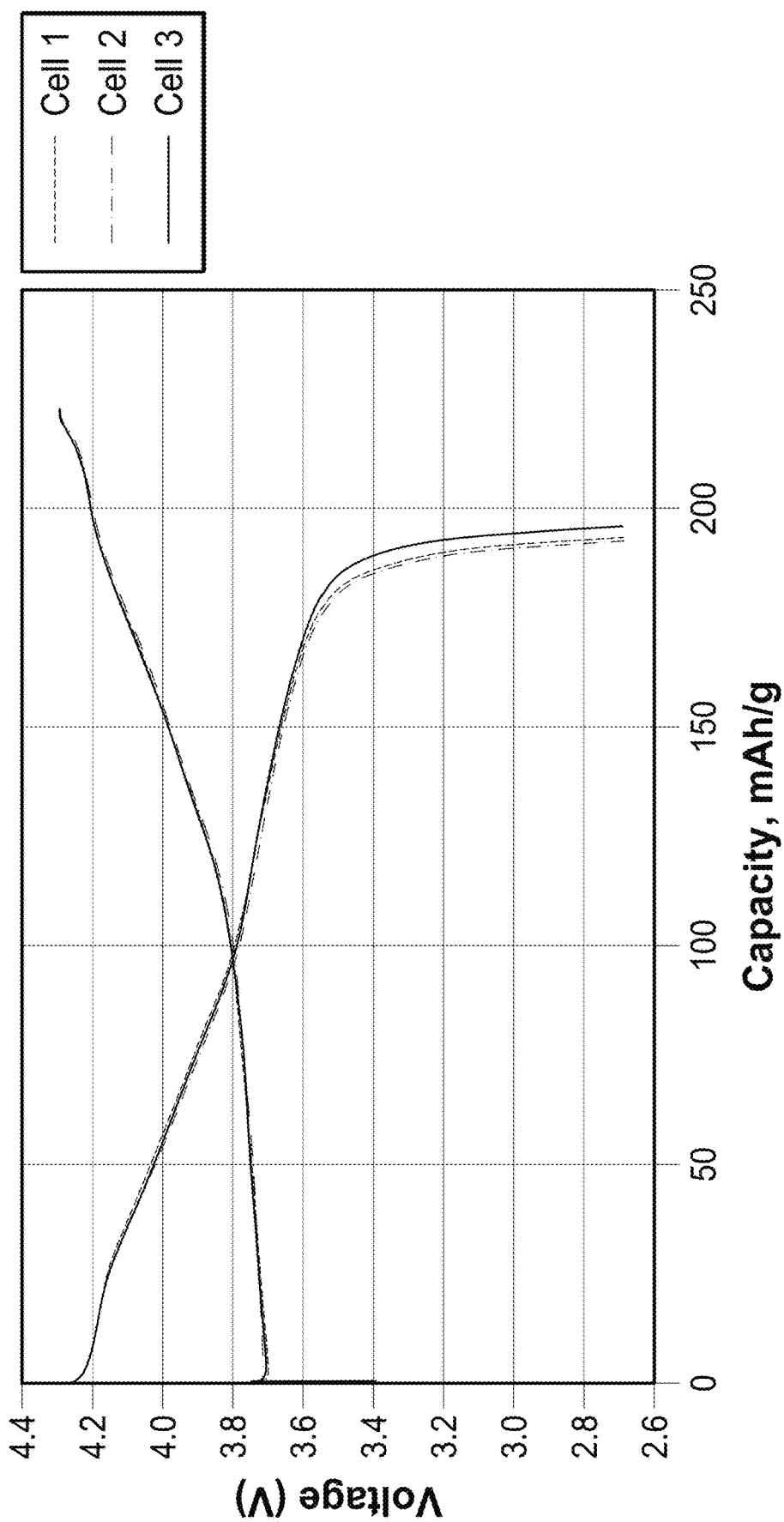
FIGS. 7A-7D depict line graphs of voltage of cathodes vs. specific capacity with high active loadings according to Formula 1 (FIG. 7A), Formula 2 (FIG. 7B), Formula 3 (FIG. 7C) and Formula 4 (FIG. 7D) of Example 7.
Figure 7B:
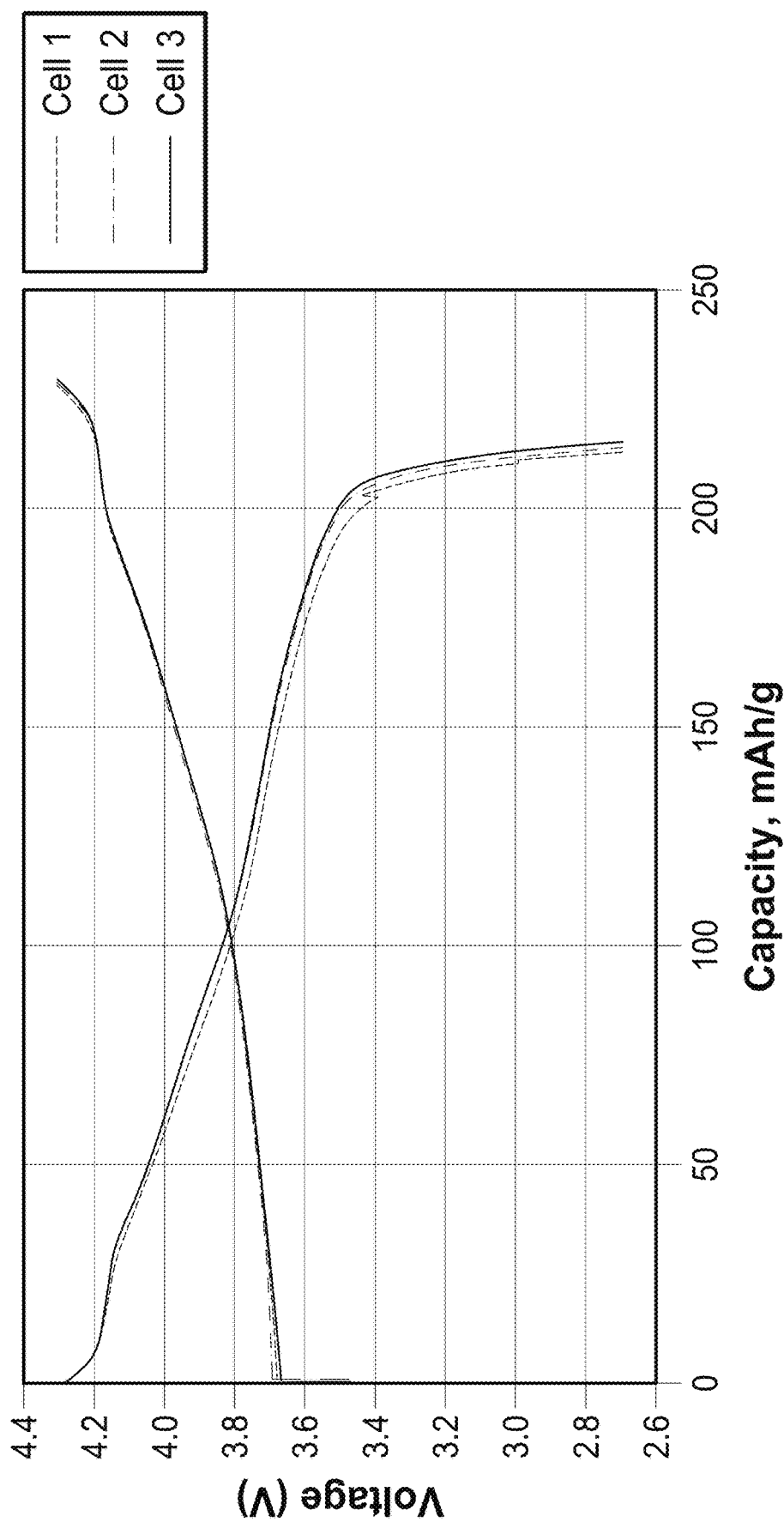
Figure 7C:
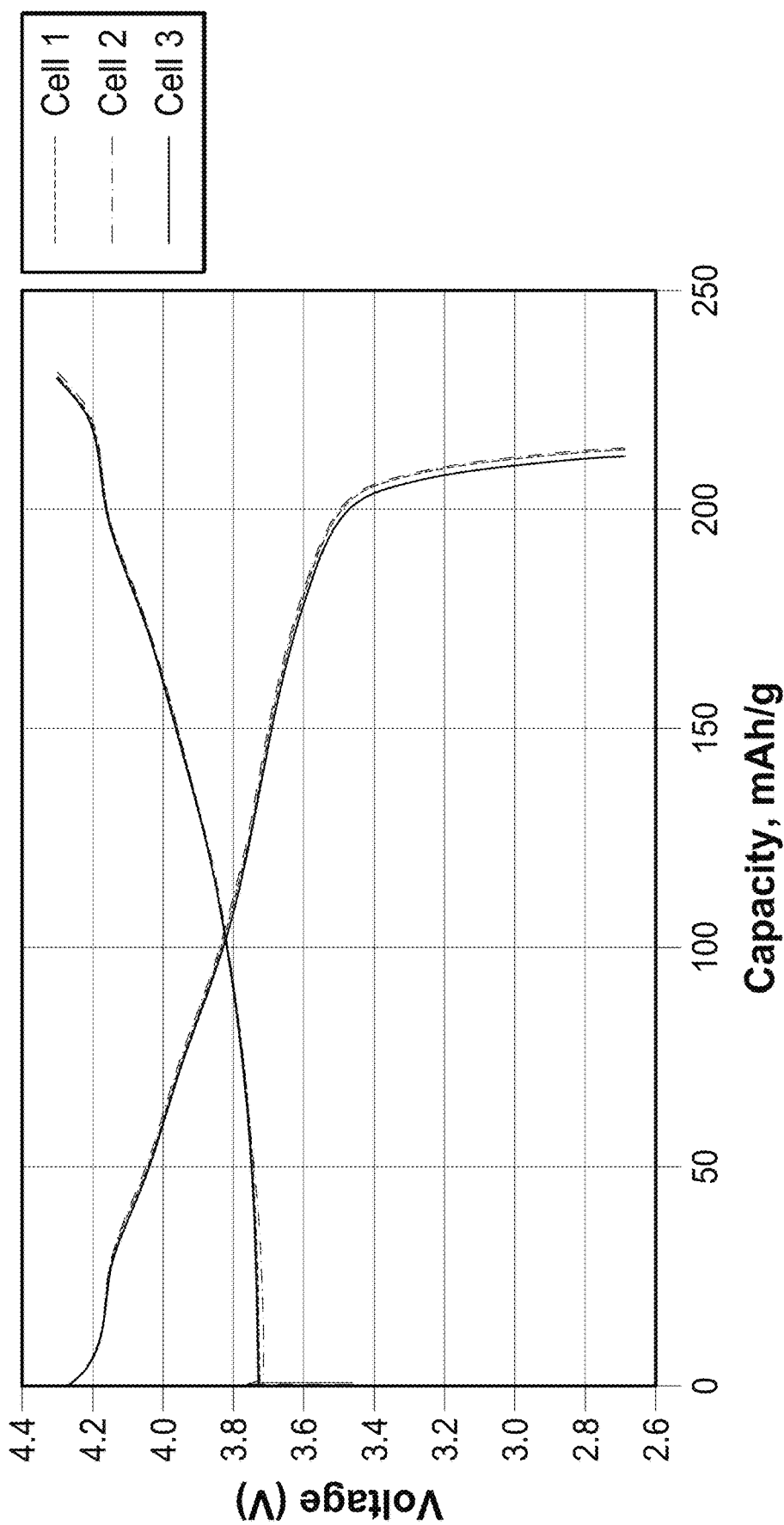
Figure 7D:
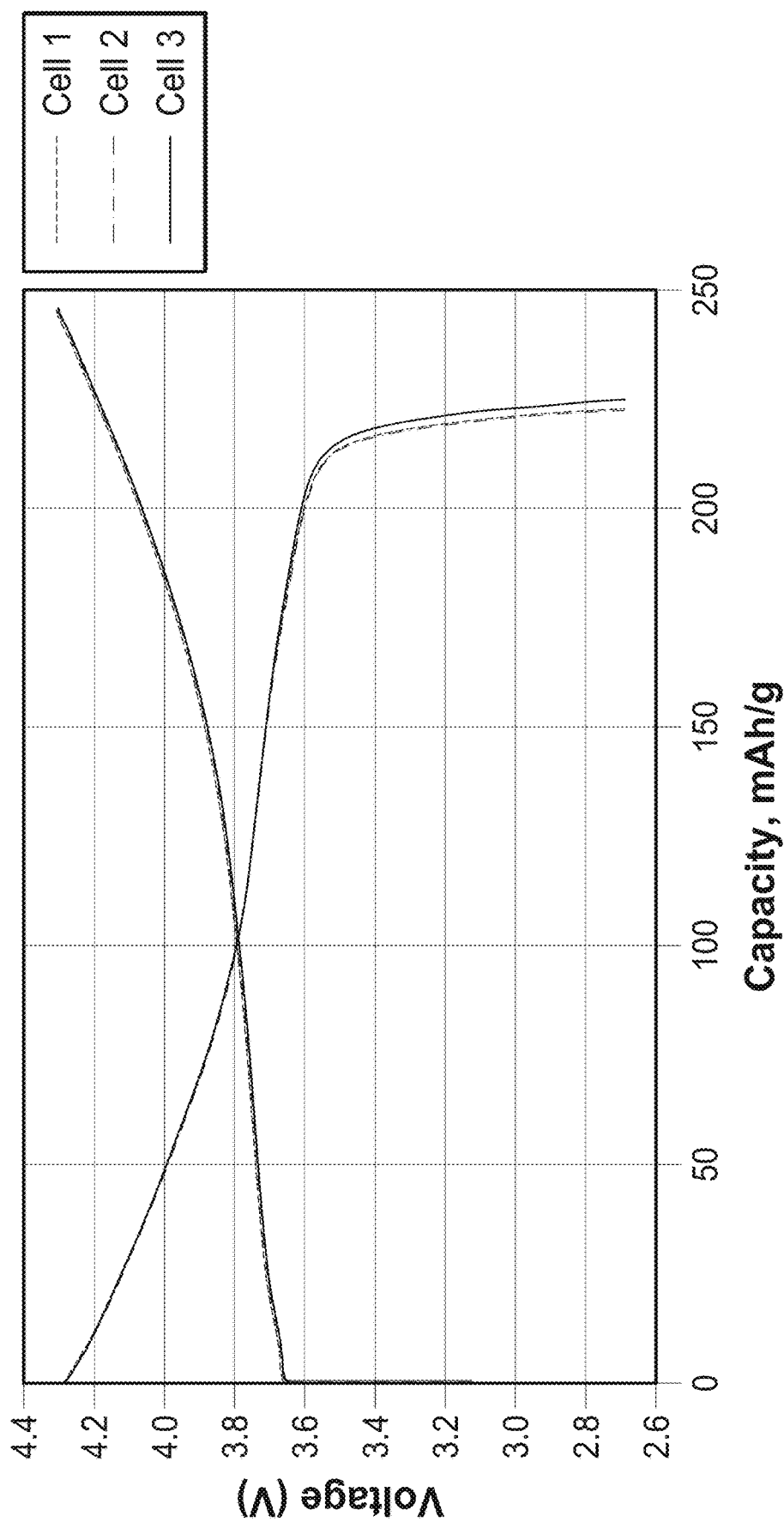

Cells having electrodes made by a dry process were cycled at 100% depth of discharge (DOD) using constant current charge and discharge rates of 0.5 C/1 C, respectively. Cycling performance was measured on an NMC111/graphite cell including dry coated electrodes in a pouch cell format. Electrode loading was 4 mAh/cm². Cut-off voltage was 4.2 V and 2.7 V for charge and discharge, respectively. It can be observed in FIG. 6 that the cell delivered more than 85% (nearly 90%) of its initial capacity after 2000 cycles.

Example 7

Dry cathode films with low binder content of Formulas 1-4 are shown in Table 2. Voltage vs. specific capacities of cathode half-cells made from Formulas 1-4 were measured as shown in FIGS. 7A-7D, and their discharge capacities and efficiencies are shown in Table 2. Formulas 1-3 were prepared by mixing NMC811, activated carbon and carbon black by high speed blending for about 10 min to create a densified powder mixture. PTFE binder was added to densified powder mixture and then blended at medium speed for additional 10 min. Formula 4 was prepared in a similar process to Formulas 1-3, however the film was prepared with NMC622, activated carbon and carbon black were non-destructively mixed using an resonant acoustic mixer.

TABLE 2

| Formula | Active Material | Activated Carbon | Carbon Black | Binder | Loading | Discharge Capacity | First Cycle Efficiency |
|---|---|---|---|---|---|---|---|
| 1 | 98 wt % NMC811 | 0.25 wt % | 0.5 wt % | 1.25 wt % PTFE | 38.4 mg/cm2 | 194 mAh/g | 87.1% |
| 2 | 97 wt % NMC811 | 0.5 wt % | 0.5 wt % | 2 wt % PTFE | 31.4 mg/cm2 | 214 mAh/g | 93.6% |
| 3 | 97 wt % NMC811 | 0.75 wt % | 0.5 wt % | 1.75 wt % PTFE | 33.2 mg/cm2 | 214 mAh/g | 92.7% |
| 4 | 97 wt % NMC622 | 0.75 wt % | 0.5 wt % | 1.75 wt % PTFE | 35.7 mg/cm2 | 179 mAh/g | 91.1% |

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" represent a value, amount, or characteristic close to the stated value, amount, or characteristic that still performs a desired function or achieves a desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

EMBODIMENTS

Various Example Embodiments are Provided Below.

1. A method of fabricating a dry electrode film of an energy storage device, comprising:
mixing an active material with a porous carbon material to form a dry active material mixture;
mixing the dry active material mixture with a dry binder to form a dry electrode film mixture; and
calendering the dry electrode film mixture to form a free-standing dry electrode film with a binder loading of at most about 2 wt. %.

2. The method of Embodiment 1, wherein calendering the dry electrode film mixture comprises at most three passes through a calender.

3. The method of any one of Embodiments 1 to 2, wherein at least one of the mixing of the active material and the porous carbon material and the mixing of the dry active material mixture with a dry binder is performed by a non-destructive mixing process.

4. The method of Embodiment 3, wherein the non-destructively mixing process is a resonant acoustic mixing process.

5. The method of Embodiment 3, wherein the non-destructively mixing process is performed by a blade type mixer with a tip speed of about 10 meters/min to about 40 meters/min.

6. The method of any one of Embodiments 1 to 2, wherein at least one of the mixing of the active material and the porous carbon material and the mixing of the dry active material mixture with a dry binder is performed by a high shear process.

7. The method of Embodiment 6, wherein the high shear process comprises a jet milling process.

8. A dry electrode film of an energy storage device, comprising:
about 90 wt. % to about 99 wt. % of a dry active material; and
at most about 2 wt. % of a dry binder, wherein the dry electrode film is free-standing.

9. The dry electrode film of Embodiment 8, comprising about 95 wt. % to about 98 wt. % of the dry active material.

10. The dry electrode film of any one of Embodiments 8 to 9, wherein the dry active material comprises dry active material particles with a D50 particle size of at least about 10 μm.

11. The dry electrode film of Embodiment 10, wherein the dry active material particles have a D50 particle size of about 10 μm to about 20 μm.

12. The dry electrode film of any one of Embodiments 8 to 11, wherein the dry active material is selected from at least one of a metal oxide, metal sulfide, a sulfur-carbon composite, a lithium metal oxide and a material including sulfur.

13. The dry electrode film of any one of Embodiments 8 to 12, wherein the electrode film comprises about 1 wt. % to about 2 wt. % of a dry binder.

14. The dry electrode film of any one of Embodiments 8 to 13, wherein the dry binder consists essentially of a single dry binder.

15. The dry electrode film of any one of Embodiments 8 to 14, wherein the dry binder comprises a dry fibrillizable binder.

16. The dry electrode film of Embodiment 15, wherein the dry fibrillizable binder comprises polytetrafluoroethylene (PTFE).

17. The dry electrode film of any one of Embodiments 8 to 16, wherein the dry electrode film further comprises at most about 8 wt. % of a porous carbon material.

18. The dry electrode film of Embodiment 17, wherein the porous carbon material comprises activated carbon.

19. The dry electrode film of any one of Embodiments 8 to 18, wherein the dry electrode film further comprises at most about 5 wt. % of a conductive additive.

20. The dry electrode film of Embodiment 19, wherein the conductive additive comprises a conductive carbon material.

21. The dry electrode film of Embodiment 20, wherein the conductive carbon material comprises carbon black.

22. An electrode comprising the dry electrode film of any one of Embodiments 8 to 21 in contact with a current collector.

23. A lithium ion battery comprising the electrode of Embodiment 22.

24. The lithium ion battery of Embodiment 23, having a first cycle device efficiency of at least about 90%.

25. The lithium ion battery of any one of Embodiments 24, having a first cycle device efficiency of about 90% to about 94%.

What is claimed is:
1. An energy storage device, comprising:
an electrode comprising a dry electrode film in contact with a current collector, wherein the dry electrode film comprises:

about 90 wt. % to about 99 wt. % of a dry active material; and at most 2 wt. % of a dry binder, wherein the dry electrode film is free-standing; and wherein the energy storage device is configured to have a first cycle device efficiency of about 90% to about 94%.

2. The energy storage device of claim 1, wherein the dry electrode film comprises about 95 wt. % to about 98 wt. % of the dry active material.

3. The energy storage device of claim 1, wherein the dry active material comprises dry active material particles with a $D_{50}$ particle size of at least about 10 μm.

4. The energy storage device of claim 3, wherein the dry active material particles have a $D_{50}$ particle size of about 10 μm to about 20 μm.

5. The energy storage device of claim 1, wherein the dry active material is selected from at least one of a metal oxide, metal sulfide, a sulfur-carbon composite, a lithium metal oxide and a material including sulfur.

6. The energy storage device of claim 1, wherein the electrode film comprises about 1 wt. % to 2 wt. % of a dry binder.

7. The energy storage device of claim 1, wherein the dry binder consists essentially of a single dry binder.

8. The energy storage device of claim 1, wherein the dry binder comprises a dry fibrillizable binder.

9. The energy storage device of claim 8, wherein the dry fibrillizable binder comprises polytetrafluoroethylene (PTFE).

10. The energy storage device of claim 1, wherein the dry electrode film further comprises a porous carbon material.

11. The energy storage device of claim 10, wherein the dry electrode film comprises at most about 8 wt. % of the porous carbon material.

12. The energy storage device of claim 10, wherein the dry electrode film comprises about 1 wt. % to about 7 wt. % of the porous carbon material.

13. The energy storage device of claim 10, wherein the porous carbon material comprises activated carbon.

14. The energy storage device of claim 1, wherein the dry electrode film further comprises a conductive additive.

15. The energy storage device of claim 14, wherein the dry electrode film comprises at most about 5 wt. % of the conductive additive.

16. The energy storage device of claim 14, wherein the conductive additive comprises a conductive carbon material.

17. The energy storage device of claim 16, wherein the conductive carbon material comprises carbon black.

18. The energy storage device of claim 1, wherein the energy storage device is a battery.

19. A method of fabricating the energy storage device of claim 1, comprising:

mixing the dry active material with the dry binder to form a dry electrode film mixture;

calendering the dry electrode film mixture to form the dry electrode film;

disposing the dry electrode film onto the current collector to form the electrode; and disposing the electrode in a housing to form the energy storage device.

20. The method of claim 19, wherein calendering the dry electrode film mixture comprises at most three passes through a calender.

21. The method of claim 19, further comprising mixing the dry active material with a porous carbon material to form a dry active material mixture, wherein mixing the dry active material with the dry binder comprises mixing the dry active material mixture with the dry binder.

22. The method of claim 21, wherein at least one of the mixing of the dry active material and the porous carbon material and the mixing of the dry active material mixture with a dry binder is performed by a non-destructive mixing process.

23. The method of claim 22, wherein the non-destructive mixing process is a resonant acoustic mixing process.

24. The method of claim 22, wherein the non-destructive mixing process is performed by a blade type mixer with a tip speed of about 10 meters/min to about 40 meters/min.

25. The method of claim 21, wherein at least one of the mixing of the dry active material and the porous carbon material and the mixing of the dry active material mixture with a dry binder is performed by a high shear process.

26. The method of claim 25, wherein the high shear process comprises a jet milling process.

* * * * *